Dec. 7, 1954 N. MOURAVIEFF 2,696,267
JET-PROPELLED HELICOPTER ROTOR STRUCTURE
Filed Feb. 13, 1951 4 Sheets-Sheet 1
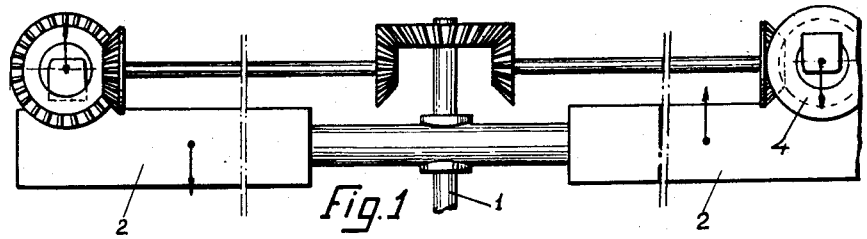
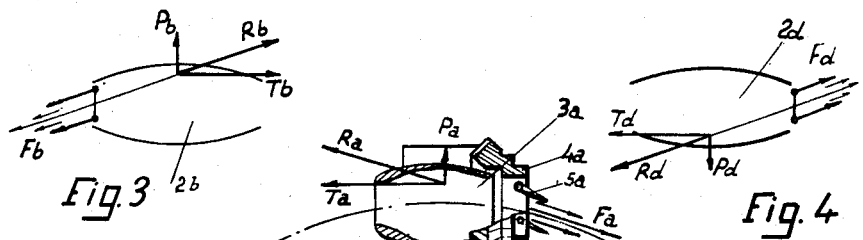
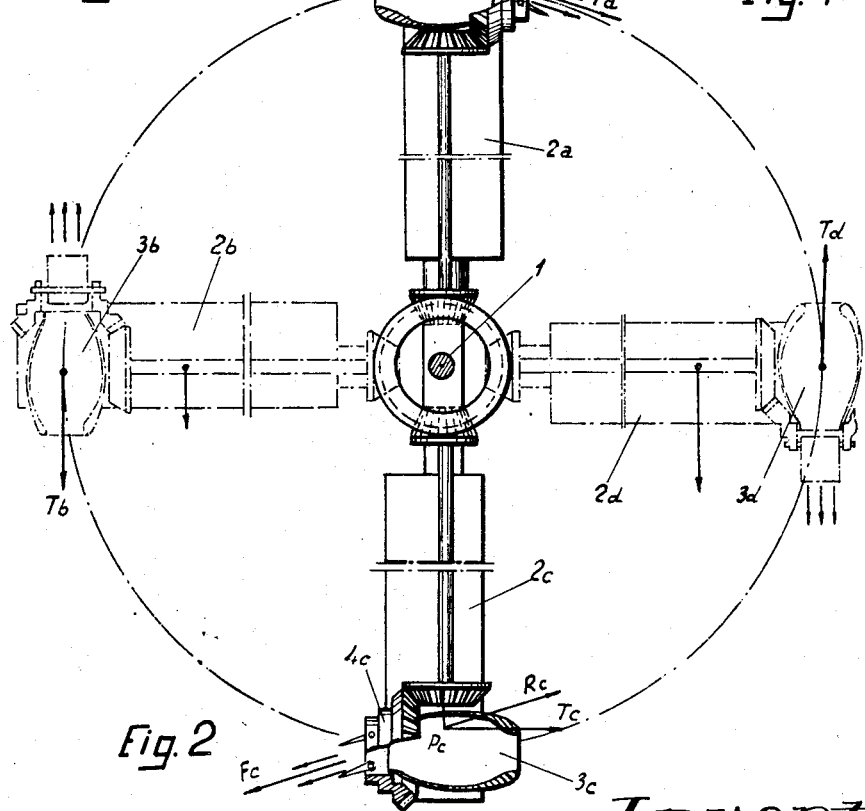
Inventor
N. Mouravieff Dec. 7, 1954  N. MOURAVIEFF  2,696,267
JET-PROPELLED HELICOPTER ROTOR STRUCTURE
Filed Feb. 13, 1951  4 Sheets-Sheet 2
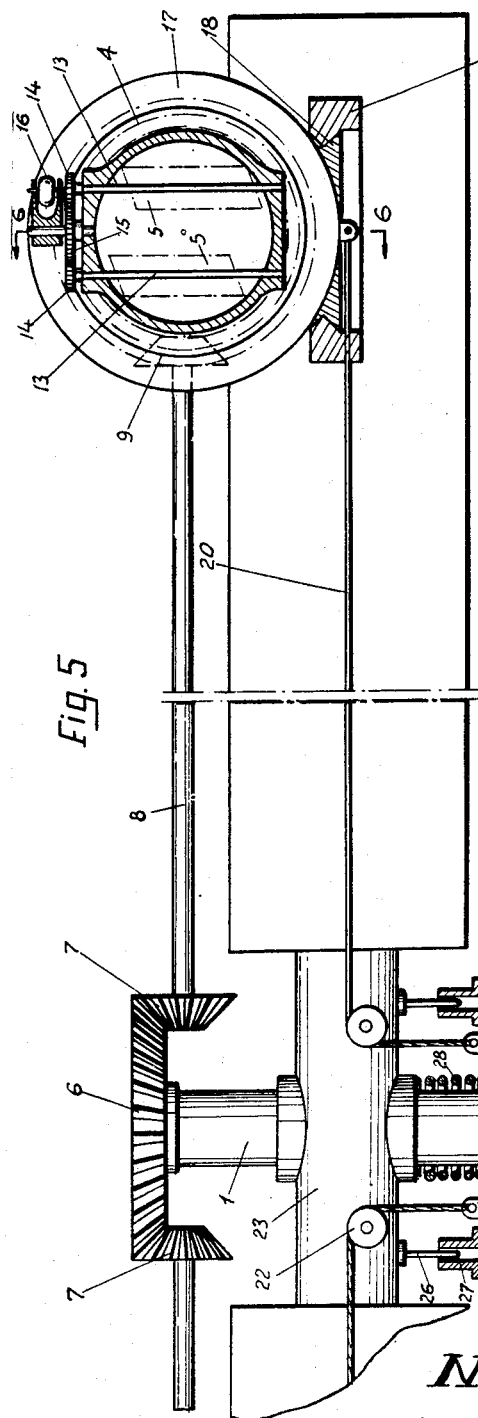
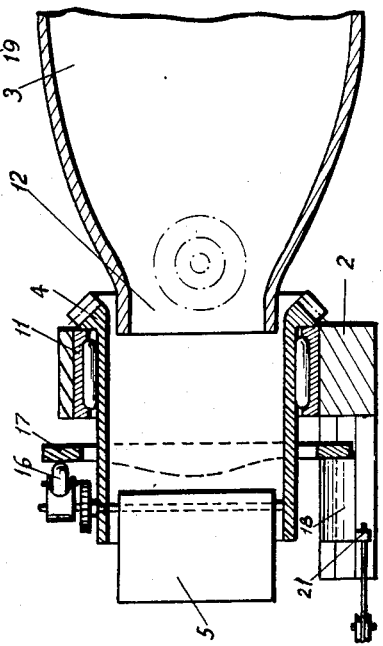
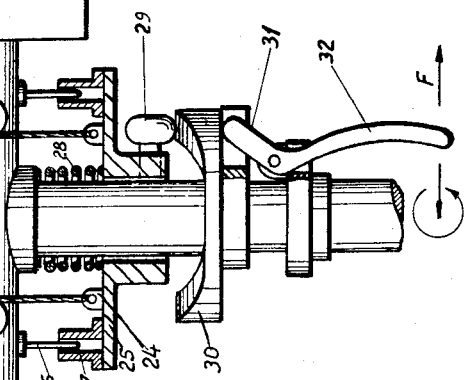
Inventor
N. Mouravieff

Dec. 7, 1954 N. MOURAVIEFF 2,696,267
JET-PROPELLED HELICOPTER ROTOR STRUCTURE
Filed Feb. 13, 1951 4 Sheets-Sheet 3

Inventor
N. Mouravieff

Dec. 7, 1954   N. MOURAVIEFF   2,696,267
JET-PROPELLED HELICOPTER ROTOR STRUCTURE
Filed Feb. 13, 1951   4 Sheets-Sheet 4
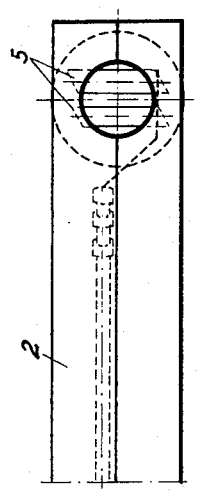
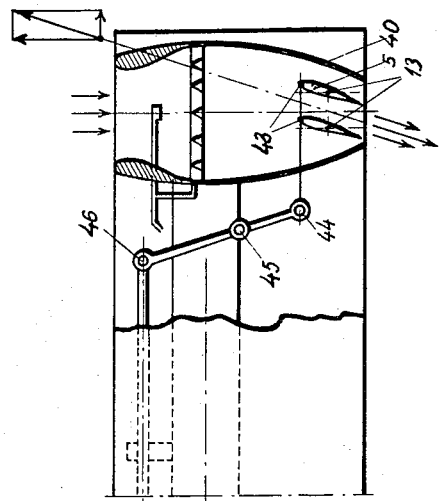
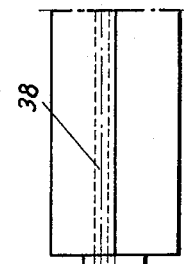
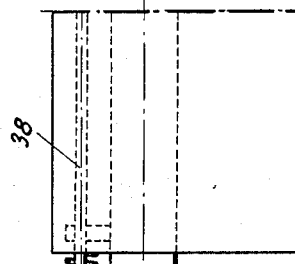
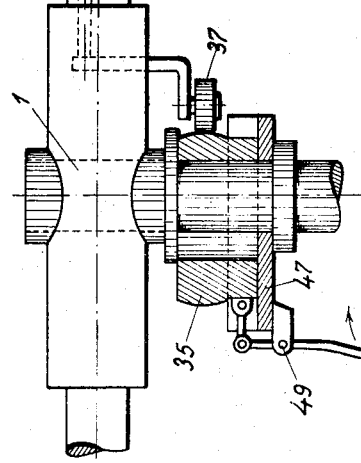
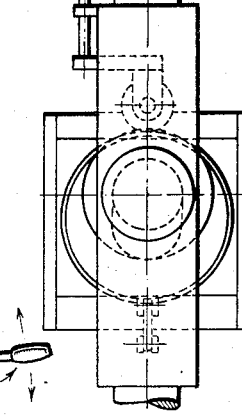
Fig. 8
Fig. 9
Inventor
N. Mouravieff United States Patent Office 2,696,267
Patented Dec. 7, 1954

2,696,267

JET-PROPELLED HELICOPTER ROTOR STRUCTURE

Nicolas Mouravieff, Grasse, France

Application February 13, 1951, Serial No. 210,670

Claims priority, application France February 15, 1950

3 Claims. (Cl. 170—135.4)

This invention relates to jet-propelled helicopters and, more precisely, to helicopters in which gas jets are ejected from the blade tips.

One object of the invention is to provide a new helicopter of this type offering the advantage of suppressing one drawback of helicopters which is the necessity of inclining the rotor axis to obtain propulsion.

Another well-known drawback of helicopters is that the aerodynamic forces exerted upon each blade undergo cyclic varations as the blade rotates. At a predetermined angular position of the blade (depending upon the direction of displacement of the helicopters), the velocity of the blade tip is a maximum while it is a minimum at another well defined angular position and varies progressively between said positions. In helicopters in which the blades are fixedly secured on the rotor shaft, said cyclic variations tend to incline the helicopter body laterally to the flight direction.

Another object of the invention is to provide a jet-propelled helicopter in which the cyclic variations of the aerodynamic forces exerted upon the blades are compensated without varying the blade pitch and without necessarily articulating the blades.

Still another object of the invention is to provide a jet-propelled helicopter in which the same means are used for generating a propulsion component and for compensating the above-mentioned undesired cyclic stress variations.

According to one feature of the invention, a jet-propelled helicopter is provided with means to impart cyclic variations to the direction in which the gases are ejected from the blade tips.

According to the invention, there is provided at the blade tip gas outlets, orientable jet directing means connected through suitable (mechanical, hydraulic or electric) transmission means with control means provided on the rotor shaft and acting cyclically.

In a preferred embodiment, said jet directing means are constituted by at least one deflecting flap orientably mounted at the gas outlet.

In another embodiment, said jet directing means are constituted by the usual nozzle orientably mounted on the blade tip.

When the above mentioned cyclic variations are intended to insure only the helicopter propulsion, said jet directing means are pivotally mounted on an axis which is substantially normal to the surface described by a longitudinal axis of the blade during the rotation of the latter, said cyclically acting means being adapted to impart said jet directing means with an oscillation of a desired amplitude during each revolution of the rotor within the required angular zones thereof.

When the above mentioned cyclic variations are intended to insure only the compensation of the undesired stress variations, said jet directing means are pivotally mounted on an axis which is substantially parallel to the blade axis, said cyclically acting means being adapted to impart to said jet directing means an oscillation of a desired amplitude during each revolution of the rotor within the required angular zones thereof.

When the above mentioned cyclic variations are intended to insure both said propulsion and compensation, said jet directing means are pivotally mounted on a spindle which is, in turn, rotatively mounted around an axis substantially at right angles to the longitudinal axis of the blade in a plane perpendicular to the axis of the rotor shaft, said cyclically acting means being adapted to impart to said spindle an angular displacement of 360° around said axis, as the blade rotates through 360° around the rotation axis of the rotor, while imparting to said jet directing means one oscillation of a desired amplitude as said blade rotates through 180°.

According to another feature of the invention, means are provided to control the amplitude of the above mentioned cyclic variations and their angular position so that the propulsion component as well as the heading of the helicopter may be operated as desired.

It will be understood that the system according to the invention, by creating components capable of compensating the undesired cyclic variations, as well as translation components, permits of suppressing blade articulations and therefore constructing helicopters the blades of which are rigidly secured on their rotation axis, the latter being held in a stationary position with respect to the cockpit, which materially simplifies the construction of these machines while reducing their cost.

This results, among other advantages, in a material improvement of the stability and efficiency by increasing the lifting effect.

The invention will be best understood from the following description with reference to the accompanying drawings in which two embodiments of the invention have been shown by way of illustration.

In these drawings:

Figures 1 to 4 show flaps mounted on crown-wheels at the gas outlets of the blade tips of a helicopter according to one embodiment of the invention, capable of ensuring both propulsion and compensation of the cyclic variations of the aerodynamic forces exerted upon the blades. Fig. 1 shows the rotary control of the flaps. Fig. 2 shows in a plan view four particular positions of a blade provided with the system according to the invention. Figs. 3 and 4 show in side view two positions already shown in Fig. 2.

Figures 5 and 6 are a front elevation and an axial longitudinal section, respectively, of the details of the control for rotating and oscillating the flaps.

Figure 8 is a partial axial sectional view of a blade, also showing control means for determining the direction in which the gases are ejected from the blade tips in the embodiment of Fig. 7 and Figure 9 is a top view corresponding to Figure 8.

Figure 7:
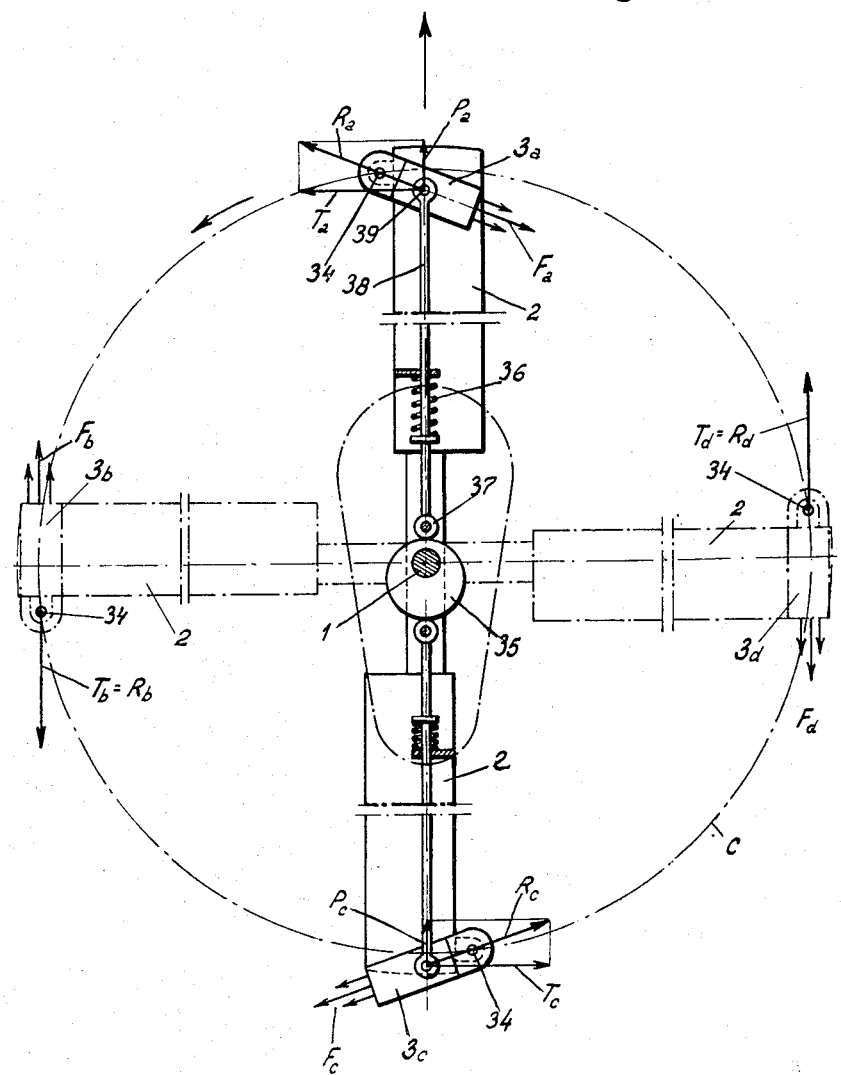
Figure 7 is a diagrammatical sectional view showing at four particular blade positions the resolution of the reaction stresses, in a simplified embodiment ensuring only the propulsion of the helicopter.

The following description relates to the case of blades which are not articulated and it has been assumed that a longitudinal axis of said blades rotates in a horizontal plane around a vertical axis.

It is clear that this representation and the corresponding description are still true in the case of articulated blades, said horizontal plane then being transformed into a conical surface having its apex on said vertical axis, in which case the invention permits moreover, to eliminate the use of cyclic pitch normally required by other types of helicopters.

Referring first to Figs. 1 to 4, there is shown at 1 the shaft of the rotor of a two-blade helicopter, said blades being shown at 2. 3 is a jet or a jet nozzle of any desired type, the gases ejected from the same being deflected in the example shown by two flaps 5 articulated on axes mounted on a crown-wheel 4 and transverse to the direction of the ejected gases. Said crown-wheel 4 is so designed that it rotates through 360° around its axis which coincides with that of the corresponding jet 3 for each revolution of 360° of blades 2 around the rotor axis 1. The mechanism controlling said rotation of crown-wheel 4 is shown in side view in Fig. 1 and in greater detail in Figs. 5 and 6.

In Fig. 2, there are shown four particular angular positions, spaced at 90°, of one blade 2 around shaft 1.

In the position shown at 2a, flaps 5a are vertical and inclined with respect to the axis of crown-wheel 4 to cause the deflection of the gases ejected from jet 3 in the direction of arrows Fa, producing a reaction force Ra which may be resolved into two components, viz. a component P$a$ directed along the longitudinal axis of blade 2 and a component T$a$ at right-angles to P$a$, both said components being located in a horizontal plane.

In the position shown at 2$b$, crown-wheel 4 has been rotated through 90° around its axis so that flaps 5$a$ now have their articulation axes in a horizontal plane and are each inclined with respect to said horizontal plane as shown in Fig. 3.

The gases are now ejected in the direction of arrows F$b$, producing a reaction force R$b$ which may be resolved into two components, viz. a first vertical component P$b$ directed upwards and another horizontal component T$b$ which is at right angles to the longitudinal axis of the blade.

In position 2$c$ of the blade, crown-wheel 4 now has rotated through 180° from position 2$a$, i. e. the axes of the flaps are vertical again, but inclined on the other side of the crown-wheel and jet axis. The gases are now ejected in the direction of arrows F$c$, producing a reaction force R$c$, which may be resolved into two horizontal components, viz. a first component P$c$ orientated along the longitudinal axis of the blade in the same direction as the above mentioned component P$a$ and another component T$c$ at right-angles to the said component P$c$.

Finally, in position 2$d$, the crown-wheel 4 has rotated a further 90°, therefore the flaps have their axes located once more in a horizontal plane and said flaps are each inclined with respect to said plane as shown in Fig. 4. The gases are now ejected in the direction F$d$. The reaction force R$d$ thus generated may be resolved into a vertical component P$d$ directed downwards and a horizontal component T$d$ at right-angles to the longitudinal axis of the blade.

The above defined components correspond to the four particular positions spaced by 90° shown in Fig. 2. Now, if the forces are observed during one complete revolution of the blades, it is clear that all components T constitute together a torque tending to rotate the blades around shaft 1 and thence produce the required lifting force, while all forces P, on the one hand, propel the helicopter in the direction P$a$—P$c$ and, on the other hand, tend to rotate the helicopter as a whole around an axis parallel to said direction. It is this latter torque which balances the forces tending to incline the helicopter due to the unbalance of the aerodynamic forces resulting from the translation in said direction.

In order to obtain an accurate compensation of said unbalance by means of said torque, it is contemplated adjusting the latter to a well defined cyclic value independently of the cyclic adjustment of the value of the propulsive components P$a$ and P$c$.

For this purpose, according to an embodiment of the invention, there is provided a mechanism as shown in Figs. 5 and 6.

Shaft 1 is provided with a bevel-pinion 6 meshing at two diametrically opposed points with two other bevel-pinions 7, which are fixed one on each of the shafts 8 parallel to the longitudinal axis of the blades 2, the other end of each of said shafts 8 carrying another bevel-pinion 9 which meshes in turn with a bevel toothed crown-wheel 4 mounted through bearings 11 (which, in the example shown, are needle roller-bearings) on each blade 2 so as to surround the nozzle 12 of jet 3. Crown-wheel 4 carries a number of flaps 5 (two in the example shown), each flap being pivotally mounted on a spindle 13, each spindle 13 having its axis located in a plane at right-angles to the axis of crown-wheel 4. Spindles 13 are extended on one side through the wall of the crown-wheel, each spindle 13 carrying on its projecting end one pinion 14, all pinions 14 meshing with one central pinion 15 on which is mounted an offset roller 16.

Roller 16 acts as a follower for an annular cam 17 fast with a block 18 which is slidably but nonrotatably mounted in guides 19 fixed with respect to blade 2.

The sliding motion of cam 17 in guides 19 is controlled by a cable 20 anchored at one end as shown at 21 on block 18 and running over a pulley 22 mounted on the blade longitudinal beam 23, the other end of cable 20 being anchored at 24 on a disc 25 which is rotatably mounted on shaft 1 and fixed to blades 2 through pins 26 slidably mounted in sleeves 27, the arrangement being such that disc 25 is rotatively driven with blades 2 while being capable of sliding freely along shaft 1; cables 20 are kept taut by a spring 28. Disc 25 carries a cam follower 29 constantly in contact with the profile of a cam 30 slidably and rotatably mounted on shaft 1. The sliding and rotation of said cam are controlled by the pilot by means of a suitable designed device capable of assuring this double control, said device being diagrammatically shown in Fig. 5 in the shape of a simple bell-crank-lever 31—32.

The device operates as follows:

Whenever blade 2 rotates through one complete revolution around shaft 1, pinions 6—7—9 and shaft 8 transmit to crown-wheel 4 a rotary motion of 360° around the crown-wheel axis. Cam follower 29 also rotates through 360° on cam 30 and imparts, through cables 20, two oscillations to cam 17. Since cam follower 16 is driven through 360° with crown-wheel 4, said follower traverses the whole profile of cam 17, following the same in its sliding motion and imparts during one revolution around the axis of the crown-wheel two oscillations to flaps 5. Thus, the amplitude of said oscillations will be determined by both cams 30 and 17. By rotating cam 30 with respect to shaft 1, said amplitude will be increased or reduced or even made equal to zero. The plane with respect to which oscillations of flaps 5 take place will be also brought into any desired angular position depending upon the longitudinal position of cam 30 along shaft 1.

It will now be apparent that this arrangement makes it possible to vary within certain limits the propulsive components P$a$ and P$c$ by shifting cam 30 along shaft 1, and to vary separately within certain limits the balancing components P$b$ and P$d$ by turning cam 30 around shaft 1.

Referring now to Fig. 7, the rotor shaft is shown at 1 and the blade at 2 as previously.

In this diagrammatically shown simplified embodiment, the gases are ejected from the blade tips through nozzles 3, each of which is articulated around an axis 34 on the corresponding blade, and normal to the surface described by the longitudinal axis of the blade. On shaft 1 is mounted a cam 35 the position of which may be varied at will in the plane of the drawing by a simple control operation effected by the pilot. Cam followers 37 are pressed against cam 35 by spring 36, each cam follower being carried by a rod 38 pivotally mounted at 39 on the corresponding nozzle 3. The operation of the device shown in Fig. 7 is as follows:

Assuming cam 35 occupies, for example, the position shown in Fig. 7, and considering first one nozzle in position 3$a$, it will be seen that gases are ejected in the direction F$a$ and produce a reaction R$a$ which may be resolved into two components T$a$ and P$a$ respectively. The tangential component T$a$ generates, during one complete turn of the rotor, on shaft 1, a torque capable of ensuring the rotation of the rotor and thence the required lifting force.

Component P$a$ directed along the longitudinal axis of the blade tends to displace the helicopter in its direction.

Assuming now the same nozzle is brought into position 3$b$, it will be seen that the gases are ejected in direction F$b$ and that the reaction acting in direction R$b$ is reduced to a tangential vector T$b$ only, generating a torque producing a rotation around shaft 1.

When the same nozzle is brought into position 3$c$, the gases now ejected into direction F$c$ generate the reaction R$c$ which may be resolved into two components, one of which is tangential while the other one is directed along the longitudinal axis of the blade. Tangential component T$c$ results as previously in a lifting generating torque while component P$c$ tends to displace the helicopter in the same direction as the above mentioned component P$a$.

Finally, it will be seen considering the same nozzle in position 3$d$, that reaction R$d$ is reduced to a tangential vector T$d$ only producing a lifting generating torque.

Thus, it is clear that by oscillating periodically nozzle 3 around its axis 34 within suitable angular zones and with a conveniently selected amplitude, the translation propelling force will be applied on the helicopter in the required direction, said force having a predetermined value.

It will be easily understood that it is possible to use any desired number of blades.

In the diagrammatical example shown in Fig. 7, the principle of the invention has been explained, assuming a nozzle articulated on the blade tip is cyclically oscillated.

In Figs. 8 and 9 is shown as an illustration, an embodiment in which each blade carries on its tip a fixed reaction jet of any known type, the variations of the gas output direction according to the invention being obtained by means of cyclically controlled orientable flaps.

In these figures, the rotor shaft and one blade are shown at 1 and 2 respectively as previously. On one tip of the blade is secured a jet 40. At the outlet of the jet are mounted a set of flaps 5. Said flaps are pivotally secured on axes 13. They are connected at 43 at one end of a lever 44 articulated in turn on a stationary pivot 45, the other end 46 of said lever being pivotally secured to another lever 38 carrying a cam follower 37 co-operating with the cam 35 mounted on shaft 1.

It is to be noted that the profile of cam 35 is such that cam followers 37 are held in a suitable rolling contact with the cam, even if the blades are hinged on the rotor hub.

The control of the amplitude of the flap cyclic oscillations and control of the flight direction are ensured by cam 35.

Said cam is slidably mounted on a small plate 47 which is rotatably but nonslidably mounted on shaft 1, a lever 48 is articulated at 49 on the small plate 47. The control may be made easier by providing a linkage actuating the lever 48 from a position easily accessible. By pivoting lever 48 around its pivot 49, the eccentricity of the cam 35 and thence the magnitude of vectors P may be varied. By rotating, through lever 48, small plate 47 around the axis of shaft 1, the direction of vectors Pa—Pc and, thus, the direction of displacement of the helicopter may be also varied.

Thus, the pilot, by one single and simple control operation has his direction and speed well in hand.

It is to be understood that any mechanical, hydraulic or electric controls may be used at will; the number of flaps may be varied if desired as well as their location with respect to the nozzle or nozzles; the blade tip jets may be substituted by nozzles fed from a compressor, a gas turbine or the like, mounted in the cockpit and that while I have illustrated specific forms of this invention, I do not intend to limit myself to these exact forms but intend to claim my invention broadly as indicated by the appended claims.

What is claimed is:

1. In a rotor structure for helicopters including at least one blade rotatable about an upright axis and a jet tube mounted at the tip of said blade to emit a fluid jet producing a propulsive force which causes said blade to rotate about said axis, in combination, deflecting means mounted for pivotal movement about an axis transverse to said jet and substantially parallel to said upright axis for directionally controlling the discharge of said jet to create, in at least one position oblique with respect to the longitudinal axis of said blade, a force component acting in a direction substantially parallel to said blade axis, and actuating means for said deflecting means operably associated therewith to cyclically actuate said deflecting means in such manner that the same are in said oblique position only while the said blade axis is substantially parallel to the direction of forward movement of the helicopter.

2. In a rotor structure for helicopters including at least one blade rotatable about an upright axis and a jet tube mounted at the tip of said blade to emit a fluid jet producing a propulsive force which causes said blade to rotate about said axis, in combination, at least one deflector flap secured on a mounting at the outlet of said tube for directionally controlling the discharge thereof at a fixed discharge angle in order to create a force component acting in a direction varying, according to the angular displacement of said mounting about the axis of said tube, between a direction perpendicular and a direction parallel to said upright axis, and means operably associated with said mounting to rotate said mounting in such manner that during a full rotation of the rotor blade said component acts in said perpendicular direction while said blade is substantially parallel to the direction of forward movement of the helicopter, and acts in said parallel direction while said blade is substantially perpendicular to said forward movement.

3. In a rotor structure for helicopters including at least one blade rotatable about an upright axis and a jet tube mounted at the tip of said blade to emit a fluid jet producing a propulsive force which causes said blade to rotate about said axis, in combination, at least one deflector flap mounted at the outlet of said tube for pivotal movement about an axis rotatable in a plane transverse to said jet for directionally controlling the discharge thereof at a variable discharge angle in order to create a force component acting in a direction which varies, according to the angular position of said rotatable axis, between a direction perpendicular and a direction parallel to said upright axis, means operably associated with said flap to rotate said rotatable axis in such manner that during a full rotation of the rotor blade said component acts in said perpendicular direction towards or away from said upright axis while said blade is substantially parallel to the direction of forward movement of the helicopter so as to cause or to assist said forward movement, and acts upwardly or downwardly in said parallel direction while said blade is substantially perpendicular to said forward movement so as to apply a lateral balancing torque to the helicopter, and control means arranged to pivot said deflector flap about said rotatable axis for adjusting said discharge angle in order to vary the magnitude of said component.

References Cited in the file of this patent

UNITED STATES PATENTS

| Number | Name | Date |
|---|---|---|
| 2,001,529 | Dornier | May 14, 1935 |
| 2,142,601 | Bleecker | Jan. 3, 1939 |
| 2,372,030 | Stalker | Mar. 20, 1945 |
| 2,457,936 | Stalker | Jan. 4, 1949 |
| 2,498,283 | Lee | Feb. 21, 1950 |